US004001573B2

United States Statutory Invention Registration [19]

[11] Reg. Number: H1573

[45] Published: Aug. 6, 1996

Budde

[54] REDUCED MASS/INERTIA SUSPENSION

[76] Inventor: Richard A. Budde, 19000 Stratford Rd. Apt. #304, Minnetonka, Minn. 55345

[21] Appl. No.: 85,767

[22] Filed: Jul. 1, 1993

[51] Int. Cl.[6] ..... G11B 5/48

[52] U.S. Cl. ..... 360/104; 360/103; 360/106

[58] Field of Search ..... 360/104, 103, 360/106

[56] References Cited

U.S. PATENT DOCUMENTS

| | | | |
|---|---|---|---|
| 4,175,275 | 11/1979 | Schaefer | 360/104 |
| 4,352,133 | 9/1982 | Hager | 360/106 |
| 4,449,155 | 5/1984 | Meier et al. | 360/104 |
| 4,760,478 | 7/1988 | Pal et al. | 360/104 |
| 4,821,130 | 4/1989 | Bernetti et al. | 360/78.04 |
| 4,949,194 | 8/1990 | MacPherson et al. | 360/104 |
| 5,025,336 | 6/1991 | Morehouse et al. | 360/97.02 |
| 5,027,240 | 6/1991 | Zarouri et al. | 360/104 |
| 5,027,241 | 6/1991 | Hatch et al. | 360/105 |
| 5,047,883 | 9/1991 | Aldrich et al. . | |
| 5,126,904 | 6/1992 | Sakurai | 360/104 |
| 5,198,945 | 3/1993 | Blaeser et al. | 360/104 |
| 5,201,458 | 4/1993 | Hagen | 360/104 |
| 5,227,937 | 7/1993 | Magnusson et al. | 360/104 |

FOREIGN PATENT DOCUMENTS

| | | | |
|---|---|---|---|
| 0137553 | 10/1981 | Japan | 360/104 |
| 0136979 | 7/1985 | Japan | 360/104 |
| 0122978 | 6/1986 | Japan | 360/104 |
| 0076078 | 4/1987 | Japan | 360/104 |
| 0144473 | 6/1988 | Japan | 360/104 |
| 0144475 | 6/1988 | Japan | 360/104 |
| 63-234470A | 9/1988 | Japan . | |
| 63-261584A | 10/1988 | Japan . | |
| 1-173377A | 10/1989 | Japan . | |

*Primary Examiner*—Bernarr E. Gregory

[57] ABSTRACT

An improved head suspension assembly (HSA) for use in dynamic storage devices and rigid disk drives provides improved shock, resonance and access time performance of disk drives, while maintaining needed lateral stiffness of the HSA. The mass and inertia of the HSA as a whole is improved, by providing an area of reduced mass constituted by an area of partial etching and/or through holes on any one or more of the constituent members, that is, the load beams flexure and/or constraint. The HSA may alternatively comprise a one-piece unitary load beam and flexure structure provided with such an area of reduced mass.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REDUCED MASS/INERTIA SUSPENSION

FIELD OF THE INVENTION

The present invention relates to an improved head suspension assembly (HSA) for use in dynamic storage devices and rigid disk drives, in order to improve the shock, resonance and access time performance of disk drives, while maintaining needed lateral stiffness of the HSA. More specifically, the present invention is directed to improvements in the design of certain component members of the HSA, that is, the load beam element, the gimballing flexure portion and/or the constraint. The improvement comprises reducing the mass and inertia of the HSA as a whole, by providing an area of reduced mass constituted by an area of partial etching and/or through holes on any one or more of these specific constituent members of the HSA.

On the load beam, the gimballing flexure portion and the constraint portion, the area of reduced mass, constituted by partial etching and/or patterned through holes, may be provided as continuous or separate areas on any generally planar expanse of any of these elements. On the load beam, this area of reduced mass can be a repeating geometric pattern of through holes which can further be provided in an area of reduced surface thickness of the load beam. The area of reduced mass on the load beam is generally within longitudinal sides of the load beam, extending from just distal of a proximal end of the load beam to just proximal of a distal end of the load beam.

On the gimballing flexure and/or the constraint, the area of reduced mass can be provided by any combination of (a) at least one through hole, (b) a repeating geometric pattern of through holes, and (c) an area of reduced surface thickness. Preferably, the through holes are circular. On the gimballing flexure portion, the area of reduced mass is provided within longitudinal side edges of the flexure portion, proximal of the gimballing arms. On the constraint portion, this area of reduced mass is provided between tooling and locating aperture(s) and the distal tip end of the constraint.

Partial etching serves to provide the area of reduced surface thickness to reduce the mass and inertia of the HSA while retaining lateral stiffness needed for sway mode resonance. In addition to or as an alternative to reduction of surface thickness, through holes also provide reduced mass as well as enhancing the etching process to obtain the desired overall mass reduction.

DESCRIPTION OF THE PRIOR ART

U.S. Pat. No. 5,126,904, Sakurai, issued Jun. 30, 1992 and entitled MAGNETIC HEAD SUPPORTING STRUCTURE WITH THICK AND THIN PORTIONS FORAN INFORMATION RECORDING APPARATUS describes a load beam provided with a lattice pattern of alternating first and second thickness areas of the spring area only of the load beam surface. Both thickness areas are of a positive thickness, and the over-all pattern is described as a tortoiseback-like pattern said to provide a higher torsional rigidity to the HSA.

SUMMARY OF THE INVENTION

In combination with a disk drive for positioning transducer heads at selected locations on respective surfaces of axially mounted rotatable disk media, the present invention provides an improved head suspension assembly (HSA) for attachment to a rigid actuator arm of said disk drive. One embodiment of the improved HSA comprises, in combination, a load beam element joined to a proximal end of the arm and a gimballing flexure portion both at a distal end of the load beam element, optionally comprising a constraint portion at a distal end of the load beam element. Another embodiment of the improved HSA comprises a unitary one-piece load beam and gimballing flexure structure. The load beam element, or the unitary structure, is joined to a proximal end of the arm, and the load beam element or unitary structure is formed with a continuous planar surface having an area of partial etching and at least one through hole within the partial etched area. The partial etched area lies generally within longitudinal side edges of the load beam element or unitary structure. The partial etched area is preferably formed with a regular geometric pattern of evenly spaced circular through holes.

DETAILED DESCRIPTION OF THE INVENTION

Figure 1:
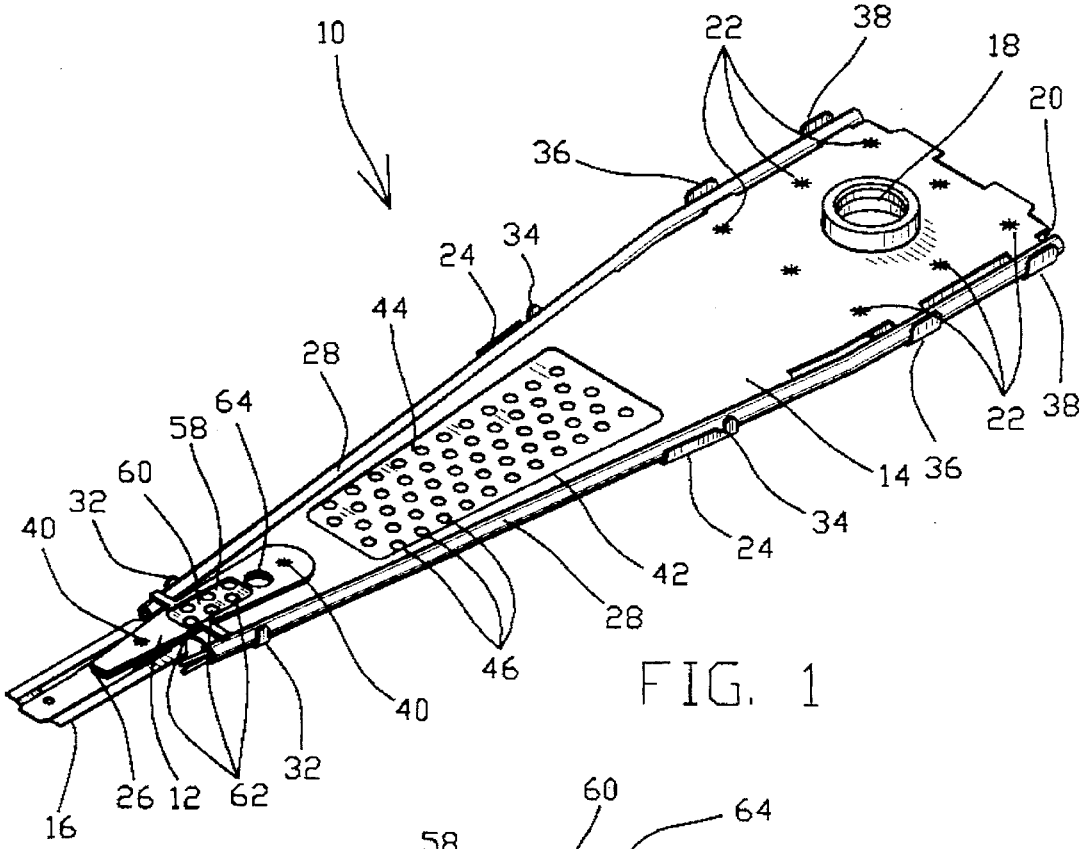
FIG. 1 is a top perspective view of a load beam element, in assembly with a gimballing flexure and a constraint, in which all three constituent members are provided with a partial etched area containing a regular pattern of evenly spaced through holes.
Figure 2A:
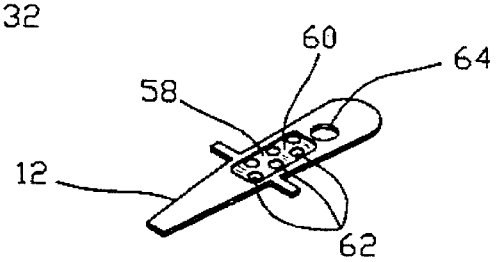
FIG. 2*a* is a top perspective view of a constraint as shown in assembly in FIG. 1, the constraint provided with a partial etched area containing a regular pattern of evenly spaced through holes.
Figure 2B:
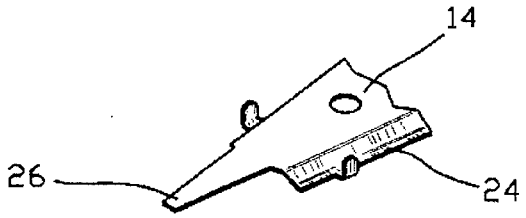
FIG. 2*b* is a top perspective view of a distal end of the load beam of FIG. 1.
Figure 3:
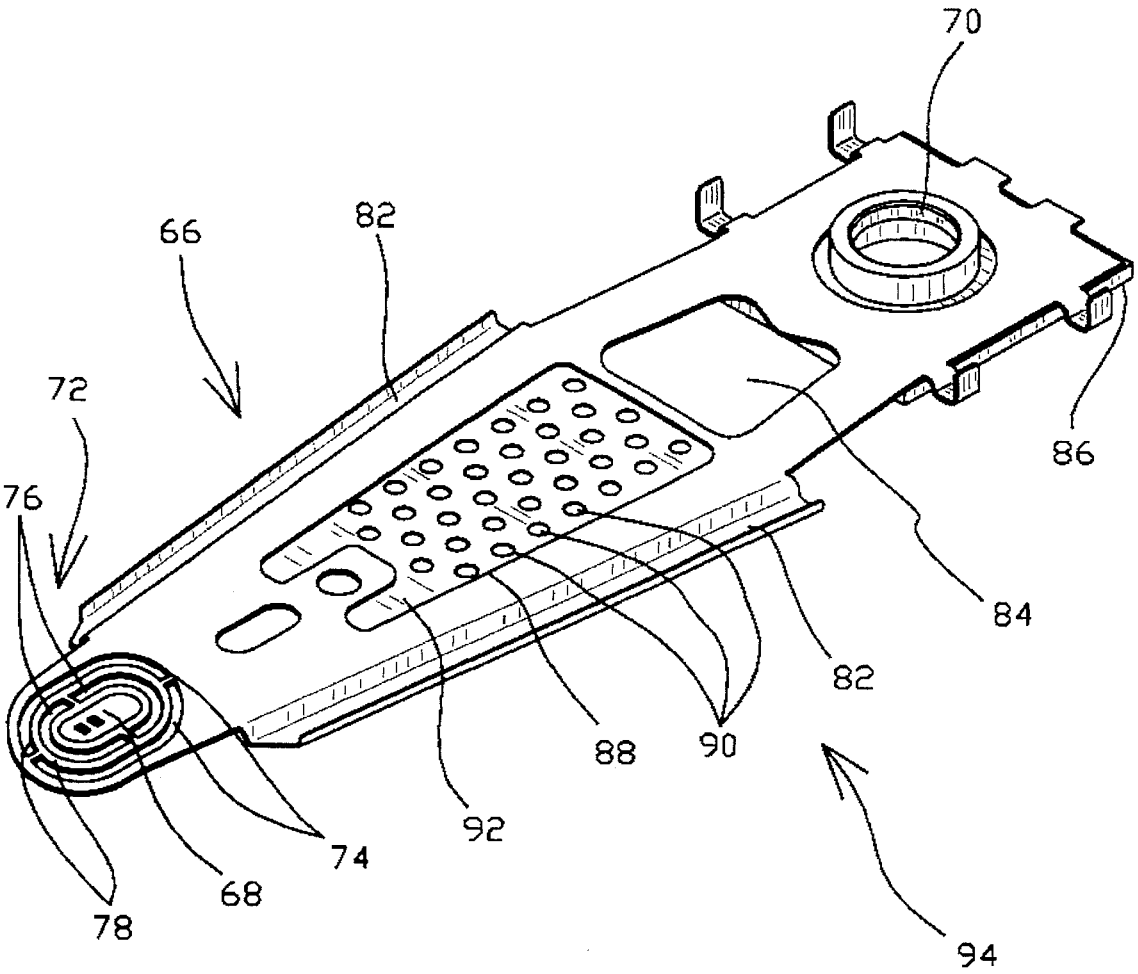
FIG. 3 is a top perspective view of an alternative load beam element of the present invention with an integral flexure portion, the load beam surface provided with a partial etched area containing a regular pattern of evenly spaced through holes.
Figure 4:
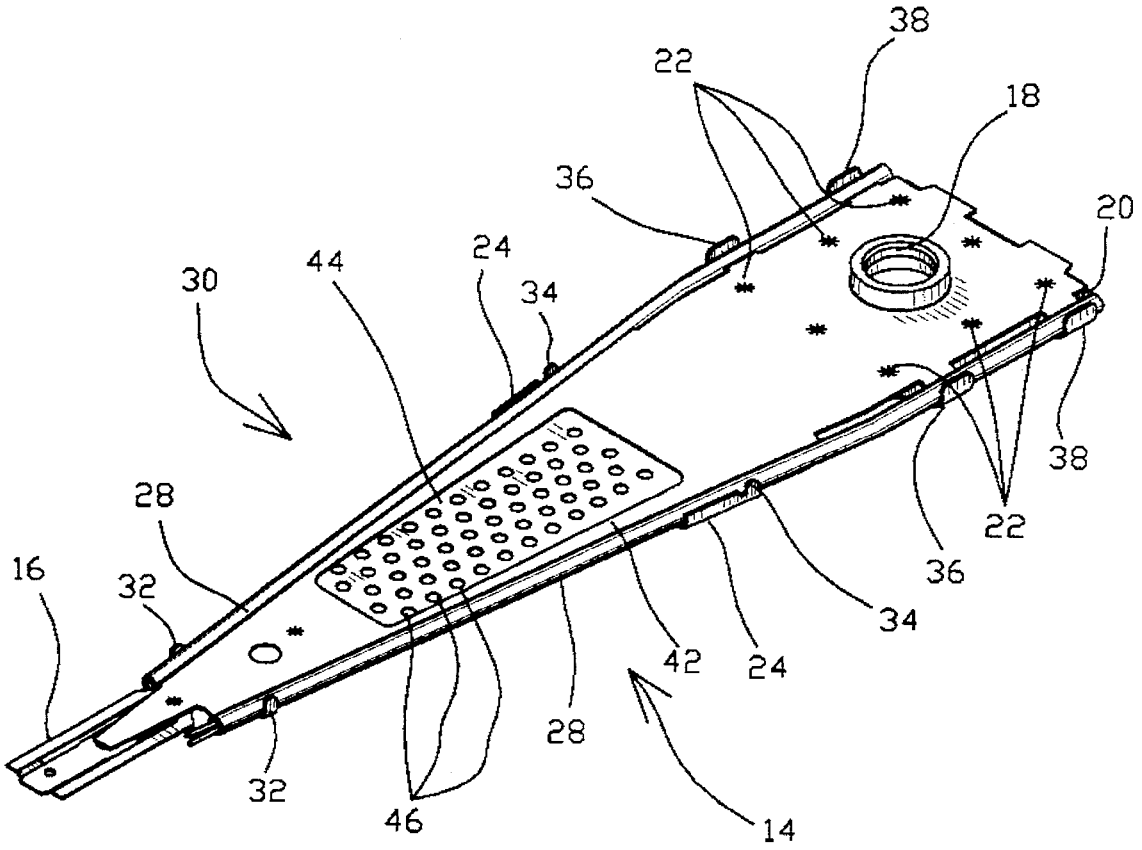
FIG. 4 is a top perspective view of another alternative load beam element similar to that shown in FIG. 1, but without a separate constraint, in which the load beam surface is provided with a partial etched area containing a regular pattern of evenly spaced through holes.

FIGS. 1, 2*a*, 2*b*, and 2*c* show a head suspension assembly (HSA) 10, in accordance with the teachings of this invention, assembled with its constituent members, including constraint 12, load beam 14 and flexure 16. FIG. 3 shows an HSA 94 with a unitary flexure and load beam structure 66, also in accordance with the teachings of this invention. FIG. 4 shows an HSA 30 of a load beam 14 and attached flexure 16. Generally, head suspension assemblies of the present invention are known as Watrous suspension systems of the type described in U.S. Pats. Nos. 3,931,641 and 4,167,765. The disclosures of these two patents are specifically incorporated by reference into the present application to provide a detailed discussion of the structure and use of Watrous suspension systems and of disk drive systems in general.

HSA 10, as shown in FIG. 1, is mounted on a rigid arm of an actuator for a magnetic disk drive (not shown) utilizing swaging boss 18, which projects upwardly from base plate 20, which is positioned against the bottom planar surface of load beam element 14. Welds 22 secure base plate 20 to the bottom surface of load beam element 14. The swaged connection of load beam 14 to a rigid arm, which may be part of an assembly of rigid arms referred to as an E-block, is well-known in the industry and is not described further herein. Alternatively, other base plate structures can be utilized which provide for securing load beam 14 to the mounting arm utilizing screws, welding, bonding or any other suitable connection means. HSAs as shown in FIGS. 3 and 4, are mounted to an actuator arm in the same manner.

As shown in FIGS. 1, 2*a*, 2*b* and 2*c*, load beam element 14, constraint 12, and flexure 16 are formed from sheet stainless steel, preferably a hard or 300 series alloy, having a nominal sheet thickness between 0.001 and 0.004 inches. Unitary flexure and load beam structure 66, as shown in FIG. 3, and load beam element 14 and flexure 16, as shown in FIG. 4, are formed of the same material.

Load beam element 14 has top and bottom planar surfaces having a width at the proximal end, adjacent the arm, which is approximately equal to the width of the arm, and then tapers to a second narrower width at distal apex 26. Load beam element 14 is resilient at its proximal end, adjacent to base plate 20, and substantially rigid for its remaining length. The rigidity is enhanced by providing, in the embodiment of the invention illustrated in FIGS. 1 and 2*b*, stiffening flanges 26 which are oriented to project downwardly as viewed in FIGS. 1 and 2*b*, that is, toward the side of load beam element 14 to which a magnetic head is to be bonded.

As shown in the load beam element 14 in FIG. 1, reduced mass area 42 is constituted by partial etching 44 and a lattice, grille, cribrous or cribriform grid of through holes 46, generally within longitudinal flanges 26 from just distal of a proximal end of load beam 14 to just proximal of distal end 24 of load beam 14.

Tubing sections 28 are secured to beam element 14 and stiffening flanges 24 by wire captures 32, 34, 36, 38 positioned on opposite edges of the planar surface of load beam element 14, as shown in FIG. 1, to enhance the vibrational damping characteristics, in particular, the first torsional resonance mode, of load beam 16. A typical load, a magnetic head (not shown), is mounted at and below distal apex 26 of load beam element 14.

Figure 2C:
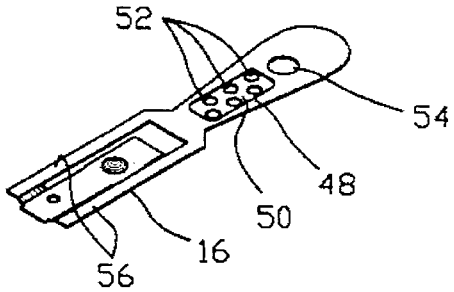
FIG. 2*c* is a top perspective view of a gimballing flexure for attachment to a distal end of the load beam of FIG. 1, also provided with a partial etched area containing. a regular pattern of evenly spaced through holes.

Flexure piece 16, shown in FIGS. 1 and 2*c*, is affixed to the bottom planar surface of distal apex 26 of load beam element 14. Reduced mass area 48 of flexure 16 is constituted by partial etching 50 and a geometric pattern of circular through holes 52 within longitudinal side edges of flexure 16, extending from just distal of tooling and locating aperture 54 to just proximal of gimballing arms 56. Constraint 12, shown in FIGS. 1 and 2*a*, is affixed to the top planar surface of distal apex 26 of load beam element 14 by welds 40. Reduced mass area 58 of constraint 12 is constituted by partial etching 60 and a geometric pattern of circular through holes 62, provided between tooling and locating aperture 64 and the distal tip end of constraint 12.

One-piece unitary flexure and load beam structure 66, as illustrated in FIG. 3, includes head support means 68, which forms the distal apex of structure 66. Swaging boss 70 is provided at the proximal end of structure 66 for attachment to a disk drive rigid actuator arm (not illustrated). Alternatively, unitary flexure and load beam 66 may be secured to the arm using screws, welding, bonding or any other known technique. The flexure portion 72 of structure 66 is formed by a number of apertures or slots 74, 76 in the vicinity of the distal apex of flexure portion 72 to form a plurality of flexible arms 78 which provide low stiffness in the pitch and roll axes to allow the head support means 68 to move freely about those axes, while providing high translational stiffness to keep the head mounted on head support means 68 from moving from side to side or from front to back as the actuator moves the slider across the face of the disk.

Stiffening rails 82 are provided along longitudinal edges of unitary flexure and load beam structure 66. Load beam cut-out 84 is provided in the surface of structure 66 at the proximal end of the tapered portion between the termination point of rails 82 and base plate 86. The removal of surface material in the vicinity of base plate 86 allows structure 66 to be quite resilient in the vicinity of its proximal end, while, because of the stiffening effect of rails 82, it is also relatively rigid for its remaining length.

Unitary flexure and load beam 66 is provided with a reduced mass area 88, constituted by a repeating geometric pattern of circular through holes 90 in an area of reduced surface thickness 92 within longitudinal sides of structure 66, extending from just distal of the proximal end of rails 82 to just proximal of the distal end of rigid portion 94.

What is claimed is:

1. In a disk drive for positioning transducer heads at selected locations on respective surfaces of axially mounted rotatable disk media, a head suspension for attachment to a rigid actuator arm of said disk drive, said head suspension comprising a load beam element joined to a proximal end of the arm, the improvement comprising that the load beam element is provided with an area of reduced mass constituted by a repeating geometric pattern of through holes in an area of reduced thickness of the load beam surface.

2. In a disk drive for positioning transducer heads at selected locations on respective surfaces of axially mounted rotatable disk media, a head suspension for attachment to a rigid actuator arm of said disk drive, said head suspension comprising, in combination:

(a) a load beam element joined to a proximal end of the arm; and (b) a flexure portion at a distal end of the load beam element;

the improvement comprising that the flexure portion is provided with an area of reduced mass constituted by a repeating geometric pattern of through holes in an area of reduced thickness of the flexure portion proximal to flexible arms of the flexure.

3. A head suspension according to claim 2, further comprising a constraint portion provided with an area of reduced mass constituted by a repeating geometric pattern of through holes in an area of reduced thickness of the constraint portion.

4. In a disk drive for positioning transducer heads at selected locations on respective surfacs of axially mounted rotatable disk media, a head suspension for attachment to a rigid actuator arm of said disk drive, said head suspension comprising a unitary one-piece structure of:

a load beam portion joined to a proximal end of the arm, and a gimballing flexible portion at a distal end of the load beam element;

the improvement comprising that the load beam portion is provided with an area of reduced arms constituted by a repeating geometric pattern of through holes in an area of reduced thickness of the load beam surface.

5. In a disk drive for positioning transducer heads at selected locations on respective surfaces of axially mounted rotatable disk media, a head suspension for attachment to a rigid actuator arm of said disk drive, said head suspension comprising a load beam joined to a proximal end of the arm, the improvement comprising that the load beam is provided with a conjoined grid structure at least partially surrounding apertures through the load beam, said grid structure having a thickness less than a thickness of the load beam.

6. In a disk drive for positioning transducer heads at selected locations on respective surfaces of axially mounted rotatable disk media, a head suspension for attachment to a rigid actuator arm of said disk drive, said head suspension comprising, in combination:

(a) a load beam element joined to a proximal end of the arm; and (b) a gimballing flexure portion at a distal end of the load beam element;

the improvement comprising that the flexure portion, proximal of flexure arms, has a first thickness and is provided with zones of a second thickness relatively less than the first thickness and a conjoined grille structure of a third thickness relatively greater than the second thickness and relatively less than the first thickness, the grille structure at least partially surrounding at least some of said zones.

7. In a disk drive for positioning transducer heads at selected locations on respective surfaces of axially mounted rotatable disk media, a head suspension for attachment to a rigid actuator arm of said disk drive, said head suspension comprising a unitary one-piece structure of:

a load beam portion joined to a proximal end of the arm, and a gimballing flexure portion at a distal end of the load beam element;

the improvement comprising that the load beam portion is provided with a conjoined grid structure at least partially surrounding openings through the load beam, said conjoined grid structure having a thickness less than a thickness of the load beam portion.

* * * * *